JOHN B. ADT.
Printing Press.

No. 120,225.  Patented Oct. 24, 1871.

Witnesses:  
H. J. Aretz.  
Thos. D. D. Durand.

Inventor:  
John B. Adt.  
per  
Attorneys.

UNITED STATES PATENT OFFICE.

JOHN B. ADT, OF BALTIMORE, MARYLAND, ASSIGNOR TO HIMSELF AND AUGUST HOEN, OF SAME PLACE.

IMPROVEMENT IN PRINTING-PRESSES.

Specification forming part of Letters Patent No. 120,225, dated October 24, 1871.

*To all whom it may concern:*

Be it known that I, JOHN B. ADT, of Baltimore, in the county of Baltimore and State of Maryland, have invented a new and Improved Printing-Press; and I do hereby declare the following to be a full, clear, and exact description of the same, reference being had to the accompanying drawing making a part of this specification, and in which—

Figure 1:
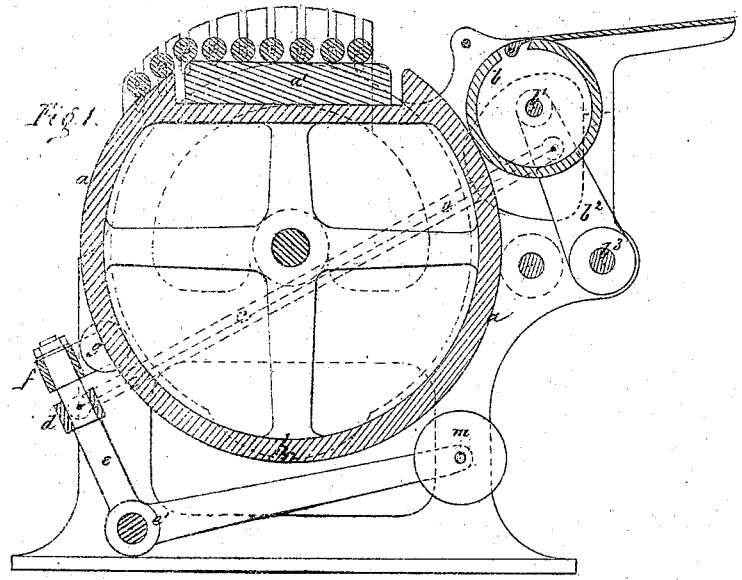
Figure 2:
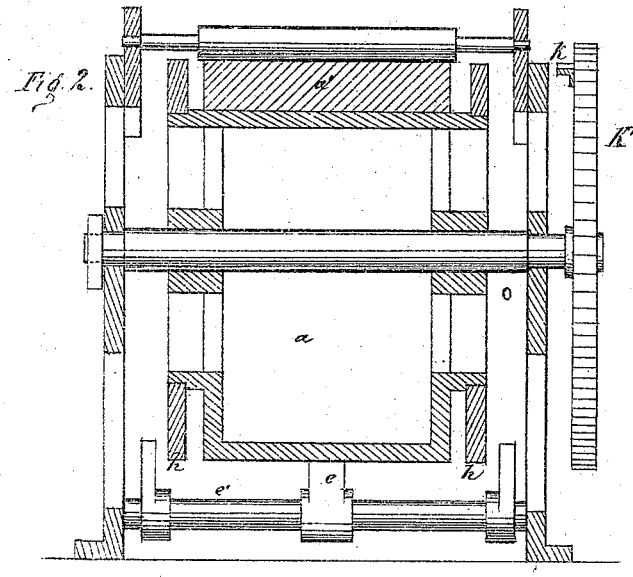

Figure 1 is a transverse vertical section, and Fig. 2 is a longitudinal vertical section.

This invention relates to cylinder printing-presses; and consists in an improved arrangement of means or devices in connection with the printing-cylinder for rendering it adjustable, so that it may follow the flattened surface in the periphery of the revolving drum, to which the form of type or the stone in lithographic printing is attached, and produce a uniform pressure thereupon.

Referring to the drawing, $a$ is the revolving drum, in a recess in whose periphery is secured the stone $a'$ or a form of type, the remainder of its periphery being used for a distributing surface. The printing-cylinder is shown at $b$, the same being supposed to have frisket-fingers and all other necessary appurtenances. The shaft $b^1$ of the cylinder $b$ passes through slots in both sides of the supporting frame-work. Said shaft is supported in the upper ends of arms $b^2$, which extend from a shaft, $b^3$, mounted in the frame-work below the printing-cylinder. The arms $b^2$ are connected, by means of rods $c$, with the ends of a cross-bar, $d$, that is pivoted at its center upon an arm, $e$, which extends from a rock-shaft, $e'$, mounted at the lower front corner of the frame-work. On the same arm $e$ is placed another cross-bar, $f$, above the bar $d$; and the bar $f$ is provided with rollers $g$ at its ends, which bear against cams $h$ formed on the drum $a$ diametrically opposite the stone $a'$. The operation of these cams is to push the arm $e$ outward as the drum revolves, and thus cause the bar $d$, by means of the rods $c$, to draw the cylinder $b$ against the surface of the stone or form, and thus to produce an even pressure upon the latter. The cylinder receives a rotary motion as soon as it touches the stone by means of a curved rack, $k$, attached to the inside of the cog-wheel $k'$, and engaging with a pinion, $l$, fixed on the shaft $b^1$. The rack $k$ clears the pinion $l$ soon after the sheet has passed between the cylinder $b$ and the stone, thus giving time for registering the next following sheet. A counter-weight, $m$, keeps the rollers $g$ in contact with the drum, thus preventing the cylinder $b$ from coming into play, except when operated by the eccentrics.

This machine can be run at great speed, has a large distributing surface, and is simple and cheap of construction.

Having thus described my invention, what I claim as new, and desire to secure by Letters Patent, is—

The cylinder $b$, combined with the arms $b^2$, shaft $b^3$, rods $c$, cross-pieces $d$ $f$, arm $e$, counter-weight $m$, rollers $o$, drum $a$, and cams $h$, as and for the purpose specified.

JOHN B. ADT.

Witnesses:
W. H. HAYWARD,
B. R. GARRETTSON.

(117)